US012610936B1

(12) United States Patent
Hui et al.

(10) Patent No.: US 12,610,936 B1
(45) Date of Patent: Apr. 28, 2026

(54) SYSTEM AND METHOD FOR MICROWAVE-BASED TARGETED INACTIVATION OF RED PALM WEEVIL INFESTATIONS IN PALM TREES

(71) Applicant: PRINCE MOHAMMAD BIN FAHD UNIVERSITY, Dhahran (SA)

(72) Inventors: Kwan San Hui, Dhahran (SA); Abdullah A. Alhamdan, Dhahran (SA); Faramarz Djavanroodi, Dhahran (SA)

(73) Assignee: PRINCE MOHAMMAD BIN FAHD UNIVERSITY, Dhaharan (SA)

( * ) Notice: Subject to any disclaimer, the term of this patent is extended or adjusted under 35 U.S.C. 154(b) by 0 days.

(21) Appl. No.: 19/295,349

(22) Filed: Aug. 8, 2025

(51) Int. Cl.
    *A01M 1/22*     (2006.01)
    *A01G 7/06*     (2006.01)

(52) U.S. Cl.
    CPC .............. *A01M 1/226* (2013.01); *A01G 7/06* (2013.01)

(58) Field of Classification Search
    CPC .... A01M 1/226; A01M 1/22; A01M 2200/01; A01M 21/046; A01M 21/04; A01M 29/28
    See application file for complete search history.

(56) References Cited

U.S. PATENT DOCUMENTS

| | | | | |
|---|---|---|---|---|
| 2,223,813 A | * | 12/1940 | Brown | A01M 1/226 |
| | | | | 426/232 |
| 5,060,414 A | * | 10/1991 | Wayland | A01M 21/046 |
| | | | | 47/1.3 |
| 5,968,401 A | * | 10/1999 | Roy | A01M 1/226 |
| | | | | 43/132.1 |
| 8,943,744 B2 | * | 2/2015 | Cohen | H05B 6/707 |
| | | | | 43/132.1 |
| 2017/0181420 A1 | * | 6/2017 | Cohen | A01M 1/2094 |
| 2018/0242532 A1 | | 8/2018 | Van Onna et al. | |

FOREIGN PATENT DOCUMENTS

| | | | | |
|---|---|---|---|---|
| CN | 102524212 A | 7/2012 | | |
| CN | 108555928 A | 9/2018 | | |
| DE | 3804052 A1 | * | 8/1989 | ............. A01D 33/06 |
| WO | WO 2010066733 A1 | 6/2010 | | |

* cited by examiner

*Primary Examiner* — Trinh T Nguyen
(74) *Attorney, Agent, or Firm* — Oblon, McClelland, Maier & Neustadt, L.L.P.

(57) ABSTRACT

A pest control device comprises a power supply configured to produce 250 to 1500 W, a microwave generator, a microwave emitter probe having a substantially cylindrical shape with a microwave emitter probe length of 5 to 50 cm and a microwave emitter probe diameter of 0.25 to 5 cm, a temperature monitor probe having a substantially cylindrical shape with a temperature monitor probe length of 1 to 25 cm and a temperature monitor probe diameter of 0.5 to 5 cm, and a controller configured to control a power of microwaves emitted by the microwave emitter probe. The pest control device operates at frequencies of 2.0 to 4.0 GHz and provides targeted pest elimination in woody plants through insertable probes that deliver controlled microwave energy directly to infestation sites while maintaining tree health through real-time temperature monitoring and automatic safety controls.

12 Claims, 11 Drawing Sheets

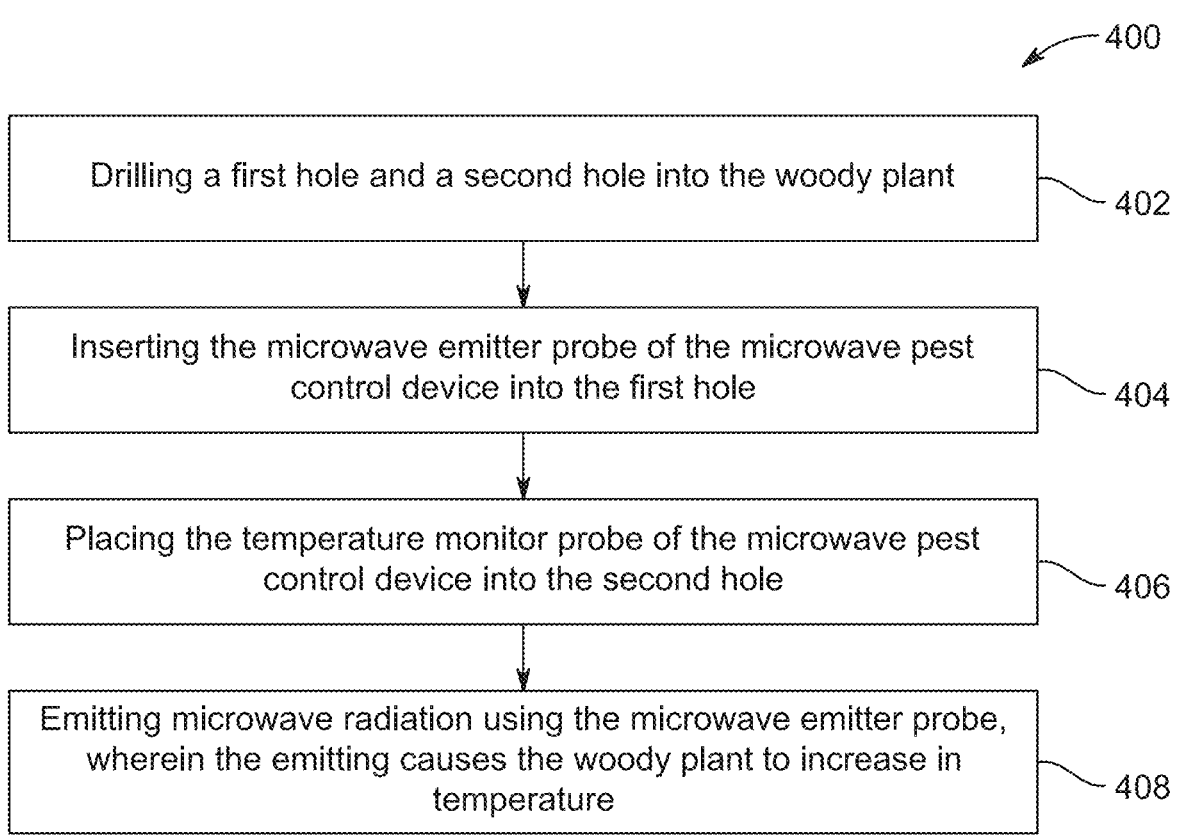

400

Drilling a first hole and a second hole into the woody plant — 402

Inserting the microwave emitter probe of the microwave pest control device into the first hole — 404

Placing the temperature monitor probe of the microwave pest control device into the second hole — 406

Emitting microwave radiation using the microwave emitter probe, wherein the emitting causes the woody plant to increase in temperature — 408

Drill Holes — 510

Insert Probes — 512

Set Power & Time — 514

Start Emission — 516

Monitor Temperature — 518

Remove Probes — 520

SYSTEM AND METHOD FOR MICROWAVE-BASED TARGETED INACTIVATION OF RED PALM WEEVIL INFESTATIONS IN PALM TREES

BACKGROUND

Technical Field

The present disclosure relates to pest control systems and methods, particularly to systems and methods for using microwave energy to eliminate insect infestations in woody plants, specifically Red Palm Weevil infestations in palm trees, through targeted microwave radiation delivered via insertable probes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Red Palm Weevil (*Rhynchophorus ferrugineus*) infestations pose a severe threat to commercial and natural palm ecosystems worldwide. These destructive pests burrow into palm tree trunks, creating extensive tunnel systems that weaken the tree's structure and disrupt its nutrient uptake pathways. The larvae feed on the internal tissues of palm trees, causing significant structural damage that often leads to tree death if left untreated. Economic losses from Red Palm Weevil infestations affect both commercial date and coconut plantations as well as ornamental palm installations in urban and resort environments.

Traditional pest control methods for Red Palm Weevil infestations present numerous limitations and drawbacks. Chemical insecticide treatments require repeated applications and often fail to penetrate sufficiently into the tree trunk to reach the larvae in their protective tunnels. These chemical approaches also pose environmental risks through soil and groundwater contamination. Physical tree removal represents another conventional approach, but results in the complete loss of valuable palm trees and fails to address the underlying infestation problem that may spread to neighboring trees. Fumigation techniques require extensive preparation and may not achieve adequate penetration into the dense internal structure of palm trunks.

Known solutions for pest control in trees include various external heating methods and chemical injection systems. Some external microwave heating systems have been proposed for pest control applications, but these systems apply heat from outside the tree structure. Such external heating methods face significant challenges in achieving adequate temperature levels at the infestation sites, which are located deep within the trunk, while avoiding damage to the outer bark and healthy tissue layers. The heat distribution from external sources becomes increasingly ineffective as distance from the heat source increases, limiting the ability to eliminate pests located in the central regions of palm trunks.

WO2010066733A1 describes a method and device for combating plant pests using generators that generate high-frequency microwaves arranged in a ring shape, directing the microwaves toward a common center. The generators are designed as ring segments to form pincer-shaped gripping arms that encompass the entire trunk area of palm trees. The system includes control panels equipped with control electronics to operate the device safely and supply the microwave generators. The temperature in the tree trunk can be determined using an infrared probe, which allows for control of the speed of heat propagation.

US20180242532A1 describes a method for reducing pathogens in and on a subject by exposing pathogens to infrared radiation, where the subject may be a plant or tree. The method includes monitoring and regulating the temperature of the affected subject using a temperature sensor applied to a hole created in the wood. The source of infrared radiation may be switched off when the temperature of the tree reaches the desired temperature or a temperature considered harmful to the tree.

CN102524212A describes a method of using microwave for killing longicorn larvae that includes detecting the distribution of larvae on the trunk, determining the microwave irradiation range, and preparing a microwave radiator with two arc reflecting plates that press against the tree trunk to form an annular sealed microwave irradiation cavity. The system comprises a microwave transmitter and controller installed within the shell, utilizing an infrared thermometer to measure the surface temperature of the irradiated tree trunk.

CN108555928A describes a forest pesticide robot that includes microwave radiometers installed on both upper and lower surfaces of a mechanical trunk that emit microwaves to pests after the location is determined through scanning by an infrared detector. The robot includes an electric drill that extends from the bottom to drill a hole in the trunk when pests are inside the tree trunk and microwave radiation cannot penetrate the trunk to irradiate the pests.

Each of the aforementioned references suffers from one or more drawbacks hindering their adoption. These approaches suffer from fundamental limitations that prevent effective control of the Red Palm Weevil. Such external heating methods face significant challenges in achieving adequate temperature levels at the infestation sites, which are located deep within the trunk, while avoiding damage to the outer bark and healthy tissue layers. The heat distribution from external sources becomes increasingly ineffective as distance from the heat source increases, limiting the ability to eliminate pests located in the central regions of palm trunks. Additionally, most existing methods require specialized equipment that is not readily portable for field applications in agricultural settings. Accordingly, it is one object of the present disclosure to provide a targeted, efficient, and environmentally friendly pest control system that can eliminate Red Palm Weevil infestations while preserving tree health and structure. Such a system should provide precise delivery of heat to infestation sites within palm trunks while minimizing damage to surrounding healthy tissue.

SUMMARY

In an exemplary embodiment, a pest control device comprises a power supply configured to produce 250 to 1500 W, a microwave generator, a microwave emitter probe having a substantially cylindrical shape with a microwave emitter probe length of 5 to 50 cm and a microwave emitter probe diameter of 0.25 to 5 cm, a temperature monitor probe having a substantially cylindrical shape with a temperature monitor probe length of 1 to 25 cm and a temperature monitor probe diameter of 0.5 to 5 cm, and a temperature monitoring system configured to control a power of microwaves emitted by the microwave emitter probe.

In some embodiments, the device is configured to produce microwaves having a frequency of 2.0 to 4.0 GHz.

In some embodiments, the microwave emitter probe comprises a coaxial cable configured to transmit microwaves from the microwave generator.

In some embodiments, the coaxial cable of the microwave emitter probe is connected to the microwave generator by a waveguide-to-coaxial adapter.

In some embodiments, the microwave emitter probe has a co-axial design comprising a central conductor and an outer conductor separated by a dielectric layer.

In some embodiments, the dielectric layer is PTFE.

In some embodiments, the microwave emitter probe further comprises a corrosion-resistant coating disposed on the outer conductor.

In some embodiments, the microwave emitter probe comprises a plurality of emission slots disposed on an exterior of the microwave emitter probe.

In some embodiments, the plurality of emission slots is formed as an array of slots, comprising a circumferential band of slots equally spaced around the exterior circumference of the microwave emitter probe.

In some embodiments, the array comprises a plurality of circumferential bands of slots. In some embodiments, the controller is configured to automatically cease microwave emission when the temperature monitor probe detects a temperature above a threshold temperature.

In an aspect, a method of treating an insect infestation of a woody plant comprises drilling a first hole and a second hole into the woody plant, inserting the microwave emitter probe of the pest control device into the first hole, placing the temperature monitor probe of the pest control device into the second hole, and emitting microwave radiation using the microwave emitter probe, wherein the emitting causes the woody plant to increase in temperature.

In some embodiments, the method further comprises ceasing the emission when the temperature monitor probe detects a temperature above a threshold temperature.

In some embodiments, the threshold temperature is 40 to 60° C.

In some embodiments, the emitting microwave radiation using the microwave emitter probe creates a heating zone having a diameter of 5 to 15 cm centered on the microwave emitter probe.

In some embodiments, the insect is a red palm weevil.

In some embodiments, the woody plant is a palm tree.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 is an exemplary flowchart listing steps involved in a method of treating an insect infestation of a woody plant, according to certain embodiments.

DETAILED DESCRIPTION

Figure 1A:
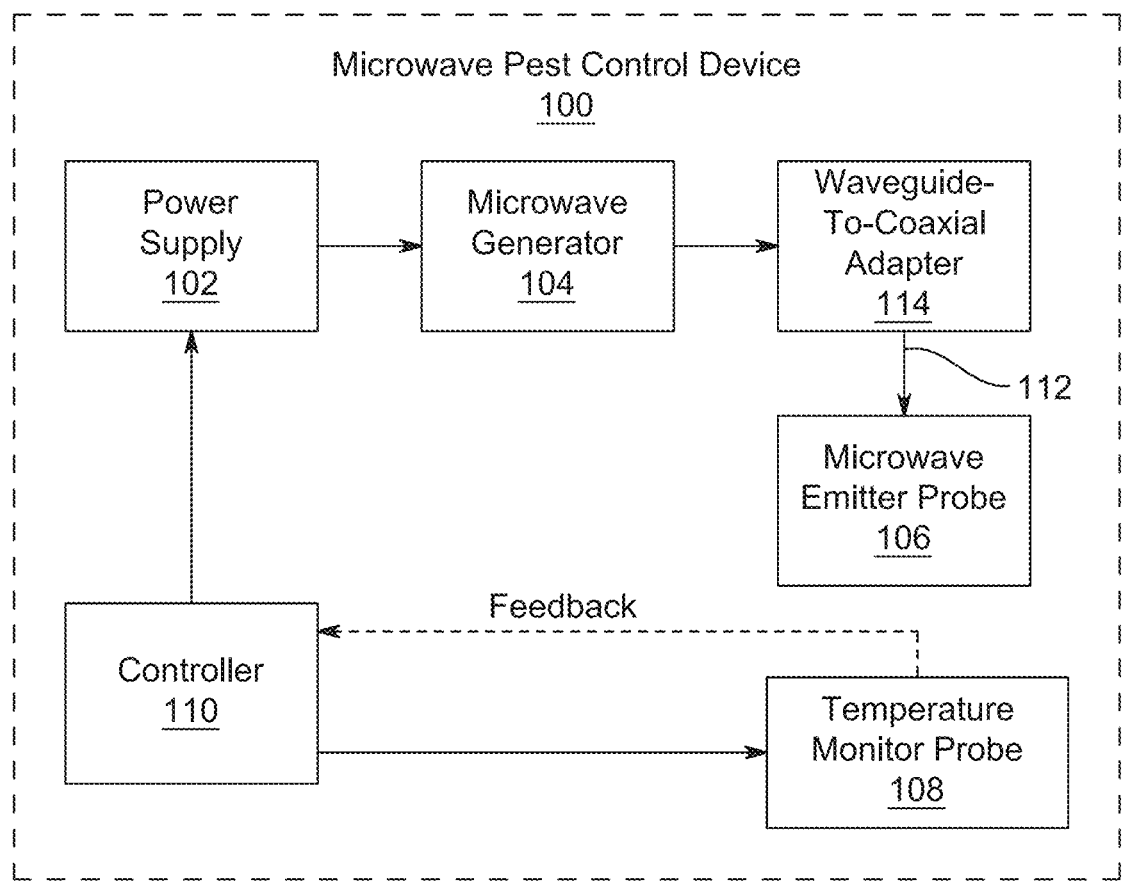
FIG. 1A is an exemplary schematic block diagram of a microwave pest control device, according to certain embodiments.

In the drawings, reference numerals designate identical or corresponding parts throughout several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a pest control device and a method of treating insect infestations of woody plants that provide targeted elimination of pest populations within plant structures through controlled application of electromagnetic energy delivered directly to infestation sites. The pest control device enables preservation of plant health while achieving effective pest control through precise temperature management and localized heating that eliminates harmful organisms without compromising the structural integrity or biological function of the host plant. The proposed device and method of treating insect infestations provides systematic procedures for applying controlled microwave energy to eliminate pest populations while maintaining plant viability through real-time monitoring and automatic safety interventions that prevent thermal damage to healthy plant tissues.

Figure 1B:
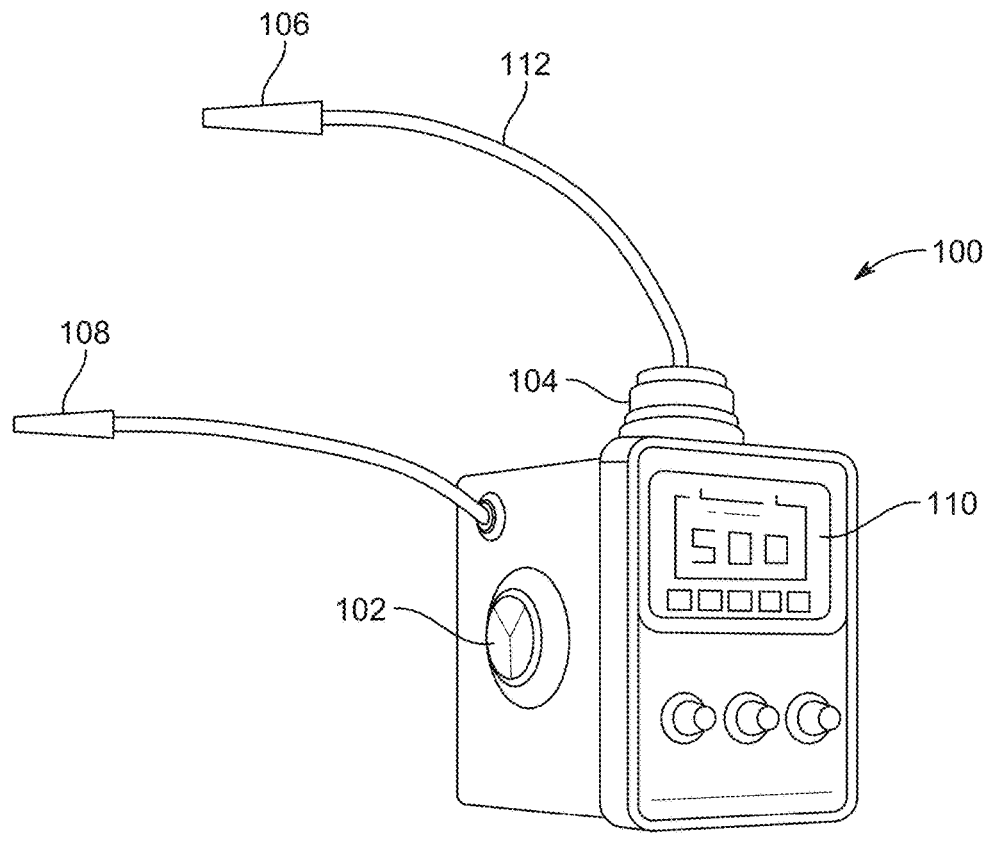
FIG. 1B is an exemplary diagrammatic perspective view of the microwave pest control device, according to certain embodiments.

Referring to FIGS. 1A and 1B, illustrated are diagrams of a pest control device (as represented by reference numeral 100), as per embodiments of the present disclosure. The pest control device 100 provides a pest management solution that integrates electromagnetic energy generation, precise delivery mechanisms, real-time environmental monitoring, and automated safety control systems within a unified platform designed for field deployment in agricultural and forestry applications. The pest control device 100 functions through coordinated operation of energy generation, transmission, monitoring, and control subsystems that enable operators to deliver heat doses to pest populations while maintaining temperatures within safe ranges for plant tissue preservation. Applications for the pest control device 100 include commercial agricultural operations, forestry management, urban landscaping, and specialized pest control services where preservation of valuable trees and plants is essential while eliminating destructive pest infestations that threaten plant health and economic value.

As illustrated, the pest control device 100 includes a power supply 102 configured to produce 250 to 1500 W. The power supply 102 converts input electrical power to regulated output power suitable for microwave generation. The power supply 102 may include voltage regulation circuitry that maintains a stable power output across the specified range of 250 to 1500 W. The power supply 102 may also incorporate safety features, including overcurrent protection and fault detection circuits. The power supply 102 is designed for field deployment applications and operates from standard electrical power sources. The adjustable power output range of the power supply 102 allows optimization of treatment parameters based on infestation severity and tree size. The power supply 102 provides electrical energy to all system components and maintains power quality required for microwave generation. The power supply 102 may include filtering components that reduce electrical noise, ensuring clean power delivery to sensitive electronic components. The power supply 102 may further incorporate thermal management features to prevent overheating during extended operation periods. The regulated output from the power supply 102 enables precise control of microwave power levels during treatment procedures.

The pest control device 100 further includes a microwave generator 104, which is connected to the power supply 102. The microwave generator 104 converts electrical power from the power supply 102 into microwave electromagnetic energy. In an example configuration, the microwave generator 104 includes a magnetron that generates microwave radiation at specified frequencies. The microwave generator 104 produces microwave energy suitable for dielectric heating of biological tissues containing pest infestations. The microwave generator 104 may be configured to operate in the industrial, scientific, and medical frequency band to ensure compliance with electromagnetic emission regulations. The microwave generator 104 may include tuning circuits that optimize power transfer efficiency and minimize reflected power. The microwave generator 104 may further include output coupling circuits that interface with waveguide components for power transmission. In some examples, the microwave generator 104 incorporates cooling systems to manage heat generated during operation. The microwave generator 104 provides a stable frequency output, enabling consistent heating patterns in target materials.

The pest control device 100 further includes a microwave emitter probe 106, which has a cylindrical shape with a length of 5 to 50 cm and a diameter of 0.25 to 5 cm. The microwave emitter probe 106 serves as the primary delivery mechanism for microwave energy to infestation sites within woody plants. The substantially cylindrical shape of the microwave emitter probe 106 facilitates insertion into drilled holes while maintaining structural integrity during use. The microwave emitter probe length range of 5 to 50 cm accommodates various tree sizes and infestation depths commonly encountered in palm tree treatments. Further, the microwave emitter probe diameter range of 0.25 to 5 cm provides flexibility for different treatment scenarios while maintaining practical insertion requirements. The microwave emitter probe 106 is constructed from materials that withstand repeated insertion and removal cycles without degradation.

The microwave emitter probe 106 is designed to deliver microwave energy in a controlled pattern that maximizes heating efficiency in the target treatment zone. The microwave emitter probe 106 incorporates features that prevent damage to healthy tree tissue while ensuring lethal temperatures are achieved in infested regions. For present purposes, the length and the diameter specifications of the microwave emitter probe 106 are optimized for Red Palm Weevil treatment applications in palm trees of various sizes. The microwave emitter probe 106 includes a tip design that facilitates insertion into wood tissue. The cylindrical geometry of the microwave emitter probe 106 provides uniform electromagnetic field distribution around the probe circumference.

The pest control device 100 further comprises one or more cooling fans configured to regulate the internal temperature of the device through active ventilation. The pest control device 100 also includes a control unit that allows for manual adjustment of operating parameters, including microwave frequency, power supply input, and microwave operation time. In some embodiments, the control unit includes a plurality of input buttons or selectors, each corresponding to a specific parameter. The microwave frequency button is configured to adjust the frequency in a range from 0 to 10 GHz. The microwave operation time button is configured to set a time duration in a range from 0 to 120 minutes. The power supply button is configured to regulate input power in a range from 250 to 1500 Watts.

In present configuration, the power supply 102 incorporates a high-voltage transformer, capacitor, and rectifier that convert input alternating current to the direct current voltage levels required for magnetron operation. The power supply 102 includes voltage regulation circuits that maintain stable output across the full power range from 250 to 1500 W, with the capability to produce the higher power levels of 300 to 1300 W for intensive treatment applications. The power supply 102 operates within a shielded enclosure that provides electromagnetic isolation and operator safety during field deployment operations. Further, the microwave generator 104 includes a magnetron assembly housed within a shielded Faraday cage that prevents electromagnetic emission beyond the designated transmission path. The microwave generator 104 incorporates interlock mechanisms that ensure operator protection by preventing microwave generation when access panels are opened or safety systems are compromised. The microwave generator 104 operates specifically in the 2.45 GHz ISM band, which provides balance between penetration depth and heating efficiency for biological tissue applications. The microwave generator 104 may also include high-voltage transformer components that convert power supply output to the voltage levels required for magnetron operation, along with capacitors and rectifier circuits that condition the electrical power for stable microwave generation by the microwave emitter probe 106.

The pest control device 100 further includes a temperature monitor probe 108 having a substantially cylindrical shape with a temperature monitor probe length of 1 to 25 cm and a temperature monitor probe diameter of 0.5 to 5 cm. The temperature monitor probe 108 provides real-time temperature measurement at the treatment site to ensure safe and effective pest control operations. The substantially cylindrical shape of the temperature monitor probe 108 enables insertion into a separate hole near the microwave emitter probe 106. The temperature monitor probe 108, with a length range of 1 to 25 cm, allows positioning at appropriate depths to monitor temperature conditions in the treatment zone. Further, the temperature monitor probe 108, with a diameter range of 0.5 to 5 cm, accommodates various temperature sensing technologies while maintaining practical insertion requirements. The cylindrical geometry of the temperature monitor probe 108 facilitates precise positioning relative to the microwave emitter probe 106. Herein, the temperature monitor probe 108 includes temperature sensing elements that provide accurate temperature measurements in wood tissue environments. The temperature monitor probe 108 provides continuous temperature feedback during treatment procedures to prevent overheating of the tree tissue. The temperature monitor probe 108 may include signal conditioning circuits that convert temperature measurements to electrical signals for processing by control systems. The temperature monitor probe 108 may also incorporate protective housings that shield sensing elements from moisture and mechanical damage. The temperature monitor probe 108 is designed for repeated use in field environments, ensuring minimal calibration drift and sensor degradation.

In an embodiment, the pest control device 100 comprises an infrared sensor disposed on or in the temperature monitoring probe 108. The infrared sensor is configured to detect the internal temperature of a tree or woody plant. The infrared sensor is further configured to detect infrared radiation within a wavelength range of approximately 0.74 μm to 14 μm.

The pest control device 100 further includes a temperature monitoring system 110 configured to control a power of microwaves emitted by the microwave emitter probe 106. The temperature monitoring system 110 functions as the central processing and control unit for managing all operational aspects of the device. The temperature monitoring system 110 further includes one or more user interface components that enable an operator to input treatment parameters and monitor system status. In some embodiments, the user interface comprises a touchscreen panel configured to display a thermogram, a temperature range from approximately 23° C. to 100° C., a microwave frequency range from 0 GHz to 10 GHz, and a microwave operation time range from 0 to 120 minutes.

The temperature monitoring system 110 also includes microprocessor circuits that execute control algorithms for power management and safety monitoring. The temperature monitoring system 110 receives input signals from the temperature monitor probe 108 and other system sensors. In one embodiment, the temperature monitoring system 110 further includes a feedback circuit configured to execute control algorithms that process infrared radiation and convert it into a thermogram for temperature analysis and visualization. The temperature monitoring system 110 generates control signals that regulate microwave power output from the microwave generator 104. The temperature monitoring system 110 incorporates data logging functions that record treatment parameters for documentation and analysis purposes. The temperature monitoring system 110 executes automatic control sequences that optimize treatment effectiveness while maintaining tree safety. The temperature monitoring system 110 manages timing sequences for treatment procedures, including startup, operation, and shutdown phases. The temperature monitoring system 110 may implement safety protocols that prevent unsafe operating conditions during treatment procedures. The temperature monitoring system 110 may also provide real-time feedback to operators regarding system performance and treatment progress. The temperature monitoring system 110 may further include fault detection circuits that identify system malfunctions and initiate appropriate protective actions.

In an embodiment, the pest control device 100 is configured to produce microwaves having a frequency of 2.0 to 4.0 GHz. The frequency range of 2.0 to 4.0 GHz provides optimal penetration characteristics for heating biological tissues within woody plant structures. This frequency range enables efficient dielectric heating of water-containing materials while maintaining practical power transmission requirements. The microwave frequency selection influences the penetration depth and heating uniformity achieved in wood tissue applications. The frequency range of 2.0 to 4.0 GHz includes the industrial, scientific, and medical band at 2.45 GHz, which provides established component availability and regulatory compliance. The selected frequency range balances the balance between penetration depth and heating efficiency for pest control applications. The frequency specifications ensure compatibility with standard microwave generation and transmission components. The frequency range selection considers electromagnetic compatibility requirements for field deployment applications.

In an embodiment, the microwave emitter probe 106 includes a coaxial cable 112 configured to transmit microwaves from the microwave generator 104. The coaxial cable 112 provides an efficient transmission line for microwave power transfer from the microwave generator 104 to the emission region of the microwave emitter probe 106. The coaxial cable 112 is designed to minimize power losses during transmission while maintaining flexibility for field deployment. The coaxial cable 112 provides the transmission path for microwave energy from the generation source to the point of application within the tree structure. The coaxial cable 112 may also include shielding that prevents electromagnetic interference with nearby electronic equipment. The coaxial cable 112 is constructed with materials that maintain performance characteristics across the operating temperature range encountered in field applications. The coaxial cable 112 may include connectors that provide secure and repeatable connections to system components. The coaxial cable 112 may also incorporate strain relief features that prevent damage from repeated handling and positioning. It may be appreciated that, in present configurations, the impedance characteristics of the coaxial cable 112 are matched to the microwave generator 104 output impedance to maximize power transfer efficiency.

In an embodiment, the coaxial cable 112 of the microwave emitter probe 106 is connected to the microwave generator 104 by a waveguide-to-coaxial adapter 114. The waveguide-to-coaxial adapter 114 provides impedance transformation between the waveguide output of the microwave generator 104 and the coaxial input of the microwave emitter probe 106. The waveguide-to-coaxial adapter 114 ensures efficient power transfer while maintaining proper electromagnetic field transitions between different transmission line types. For present purposes, the waveguide-to-coaxial adapter 114 may include precision mechanical interfaces that provide repeatable electrical connections. The waveguide-to-coaxial adapter 114 may also incorporate impedance matching elements that minimize power reflections and maximize forward power transfer. The waveguide-to-coaxial adapter 114 is designed to handle the full power output range of the microwave generator 104 without performance degradation. In the microwave emitter probe 106, the waveguide-to-coaxial adapter 114 enables modular system configuration by providing a standardized interface between major system components. The waveguide-to-coaxial adapter 114 facilitates maintenance and component replacement through accessible connection points, while also maintaining electromagnetic compatibility requirements and providing necessary signal conversion functions.

In present examples, the waveguide-to-coaxial adapter 114 may utilize a WR-340 waveguide interface that provides standard compatibility with the microwave generator 104 output. The waveguide-to-coaxial adapter 114 incorporates impedance-matching structures that minimize power reflection and maximize transmission efficiency between the waveguide output and the coaxial transmission line of the microwave emitter probe 106. The waveguide-to-coaxial adapter 114 also maintains consistent impedance transformation across the full operating frequency range while handling the complete power output range from 250 to 1500 W without performance degradation or thermal stress.

Figure 2:
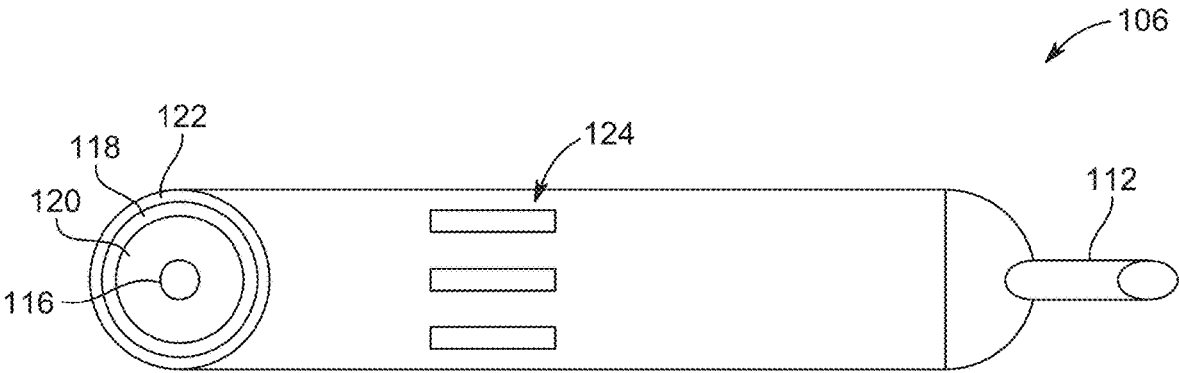
FIG. 2 is an exemplary section view of a microwave emitter probe of the microwave pest control device, according to certain embodiments.

Referring to FIG. 2, illustrated is a cross-sectional view of the microwave emitter probe 106 showing the coaxial structure and emission features according to certain embodiments. In an embodiment, as illustrated, the microwave emitter probe 106 has a co-axial design including a central conductor 116 and an outer conductor 118 separated by a dielectric layer 120. The co-axial design provides controlled impedance characteristics and electromagnetic field distribution for efficient microwave transmission and radiation. The central conductor 116 carries the microwave signal current and serves as the primary path for the propagation of electromagnetic energy.

The central conductor 116 is constructed from high-conductivity materials that minimize resistive losses during power transmission. Further, the outer conductor 118 provides electromagnetic shielding and serves as the return path for microwave currents. The outer conductor 118 includes emission features that allow for the controlled radiation of microwave energy into the surrounding wood tissue. The outer conductor 118 is constructed from materials that provide mechanical strength and corrosion resistance for field applications. The cylindrical geometry of the outer conductor 118 facilitates uniform field distribution around the probe circumference. Further, the dielectric layer 120 separates the central conductor 116 and the outer conductor 118 while maintaining proper impedance characteristics throughout the probe length. The dielectric layer 120 provides electrical insulation, preventing short circuits between conductors during operation. The dielectric layer 120 is constructed from materials that maintain stable electrical properties across the operating temperature range. The thickness and material properties of the dielectric layer 120 are selected to achieve the desired characteristic impedance for the coaxial transmission line.

In particular, as may be seen, the central conductor 116 extends along the central axis of the microwave emitter probe 106 and provides the primary current path for microwave signal propagation. The central conductor 116 has a circular cross-section that maintains consistent impedance characteristics throughout the probe length. The dielectric layer 120 surrounds the central conductor 116 and provides uniform spacing to the outer conductor 118. The dielectric layer 120 maintains consistent thickness around the circumference of the central conductor 116 to ensure balanced electromagnetic field distribution. The outer conductor 118 forms the external surface of the microwave emitter probe 106 and includes features (as discussed later) that allow controlled radiation of microwave energy. The co-axial design enables control of electromagnetic field patterns and power distribution within the treatment zone. The co-axial structure also provides mechanical protection for the central conductor 116 while maintaining electrical performance characteristics. The co-axial design further facilitates manufacturing consistency and enables reliable field performance across multiple probe units.

In the present configuration, the central conductor 116 includes solid copper or silver-plated copper core material that provides optimal microwave conduction with minimal resistive losses during power transmission. The central conductor 116 may maintain a radius range of 0 to 1.0 mm, corresponding to a diameter of 2.0 mm, which establishes the proper impedance characteristics for the coaxial transmission line. Herein, the dielectric layer 120 extends from the central conductor 116 surface to a radius of 1.0 to 4.0 mm, providing a total dielectric layer thickness that achieves the desired characteristic impedance while maintaining mechanical stability during probe insertion and operation. Further, the outer conductor 118 extends from the dielectric layer 120 surface to a radius of 4.0 to 5.0 mm, resulting in a total microwave emitter probe diameter of 10.0 mm. The outer conductor 118 may include brass or stainless steel materials that provide mechanical strength and corrosion resistance required for repeated insertion into wood tissue environments. The outer conductor 118 may have a wall thickness of approximately 1.0 mm that provides adequate structural integrity while enabling precise formation of the emission slots 124. It may be noted that the outer conductor 118 serves as both an electromagnetic shield and microwave emitter through the controlled radiation pattern created by emission slots (as discussed below).

In an embodiment, the dielectric layer 120 is PTFE (polytetrafluoroethylene). PTFE provides good dielectric properties including low loss tangent and stable permittivity across the operating frequency range of 2.0 to 4.0 GHz. PTFE maintains consistent electrical properties across wide temperature ranges encountered during microwave heating applications. The chemical resistance of PTFE prevents degradation from exposure to moisture and organic compounds present in wood tissue environments. PTFE also provides mechanical properties, including flexibility and dimensional stability, that maintain coaxial geometry during probe insertion and operation. The low coefficient of friction of PTFE may facilitate smooth insertion of the microwave emitter probe 106 into drilled holes in wood tissue. PTFE further maintains electrical insulation properties that prevent breakdown between the central conductor 116 and the outer conductor 118 under high-power operating conditions. Furthermore, the thermal stability of PTFE enables operation at elevated temperatures generated during microwave heating processes. Thus, the selection of PTFE for the dielectric layer 120 ensures long-term reliability and consistent performance across multiple treatment cycles.

In some embodiments, the microwave emitter probe 106 further includes a corrosion-resistant coating 122 disposed on the outer conductor 118. The corrosion-resistant coating 122 maintains electrical conductivity of the outer conductor 118 while providing chemical protection, by protecting the outer conductor 118 from chemical attack by moisture, organic acids, and other corrosive substances present in wood tissue environments. The corrosion-resistant coating 122 includes materials such as noble metal plating, ceramic coatings, or polymer films that resist degradation in biological environments. The corrosion-resistant coating 122 is applied using processes that ensure uniform coverage and adhesion to the underlying conductor material. The thickness of the corrosion-resistant coating 122 is selected to provide adequate protection without significantly affecting the electromagnetic performance of the microwave emitter probe 106. Thus, the corrosion-resistant coating 122 helps to extend the operational life of the microwave emitter probe 106 through repeated exposure to field conditions.

Further as illustrated in FIG. 2, in present embodiments, the microwave emitter probe 106 includes a plurality of emission slots 124 disposed on an exterior of the microwave emitter probe 106. The plurality of emission slots 124 provides controlled openings in the outer conductor 118 that allow microwave energy to radiate into the surrounding wood tissue. The plurality of emission slots 124 is positioned along the length of the microwave emitter probe 106 to create a distributed heating pattern in the treatment zone. The dimensions and spacing of the plurality of emission slots 124 are optimized to achieve uniform power distribution while maintaining structural integrity of the outer conductor 118. The plurality of emission slots 124 may be machined or formed in the outer conductor 118 using manufacturing processes that ensure consistent dimensions and placement. The plurality of emission slots 124 provides the primary mechanism for coupling microwave energy from the transmission line mode within the microwave emitter probe 106 to the radiation mode in the surrounding wood tissue. Thereby, the plurality of emission slots 124 enables localized heating of wood tissue containing pest infestations while minimizing energy loss to surrounding healthy tissue, providing field pattern control that maximizes heating efficiency in target pest habitat zones.

Herein, the plurality of emission slots 124 is formed as an array of slots. The array includes a circumferential band of slots 124, equally spaced around the exterior circumference of the microwave emitter probe 106. Specifically, the array includes a plurality of circumferential bands of slots 124. The circumferential band of slots 124 provides uniform azimuthal power distribution around the microwave emitter probe 106. The circumferential band configuration enables complete coverage of the cylindrical treatment zone surrounding the microwave emitter probe 106. The array of slots 124 in each circumferential band is positioned at predetermined angular intervals that optimize field uniformity. It may be appreciated that the circumferential band arrangement provides symmetrical heating patterns that are independent of the probe's rotational orientation during insertion. Further, the equal spacing of slots about the exterior circumference ensures balanced heating patterns that prevent hot spots or unheated regions in the treatment zone. Such array configuration facilitates predictable and repeatable heating patterns across multiple treatment applications, enabling efficient coupling of microwave energy into wood tissue with varying moisture content and density characteristics.

In the present configuration, the emission slots 124 may be in the form of longitudinal slots that extend parallel to the central axis of the microwave emitter probe 106 while maintaining precise dimensional specifications for consistent electromagnetic performance. Each emission slot 124 measures approximately 12 mm in length and 1.2 mm in width, with rectangular geometry that provides controlled aperture characteristics for microwave radiation. The emission slots 124 are positioned with the first circumferential band beginning 10 mm from the probe tip to allow for mechanical insertion without immediate heating of surface tissues. The emission zone length extends 97 mm along the microwave emitter probe 106, creating a cylindrical heating pattern with approximately 10 cm length and 7 to 10 cm diameter that encompasses typical Red Palm Weevil infestation volumes.

Figure 3A:
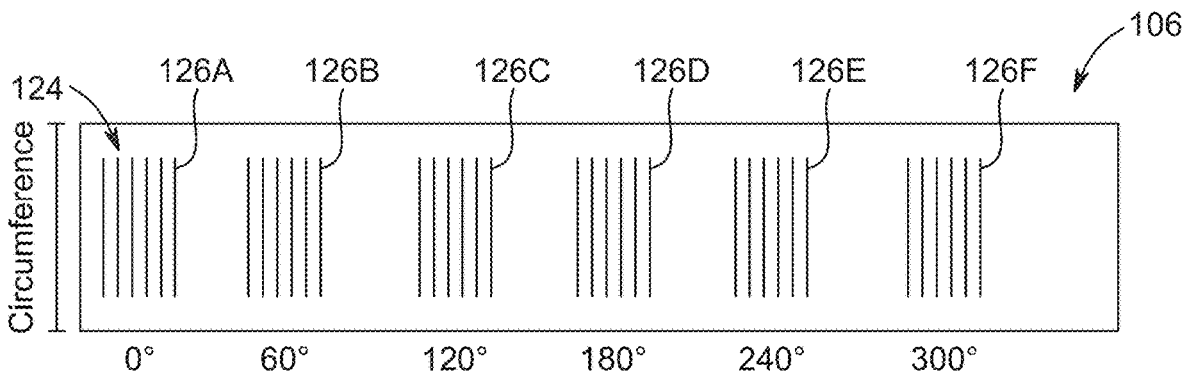
FIG. 3A is a detailed view of emission slot patterns for the microwave emitter probe, according to certain embodiments.
Figure 3B:
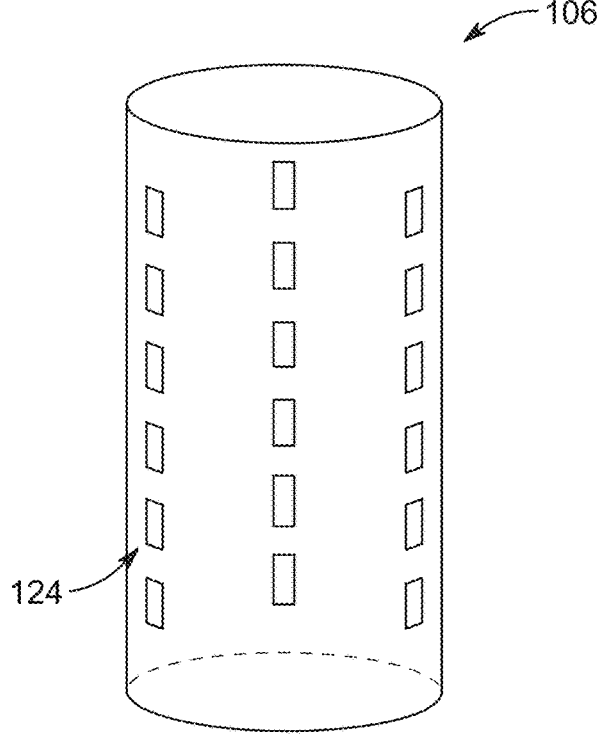
FIG. 3B is a detailed view of emission slot coordinates for the microwave emitter probe, according to certain embodiments.

Referring to FIGS. 3A and 3B, illustrated are exemplary views of the microwave emitter probe 106 showing emission slot patterns and coordinates therein. In an example, as shown in FIGS. 3A and 3B, the emission slots 124 are arranged in six circumferential bands 126A, 126B, 126C, 126D, 126E, and 126F distributed along a 15 cm length microwave emitter probe 106. Each circumferential band includes six emission slots 124 (not all shown) positioned at 60-degree angular intervals around the probe circumference. The slot arrangement provides 36 total emission points distributed over the active heating zone of the microwave emitter probe 106. In an exemplary confirmation, the emission slots 124 have rectangular geometry with dimensions of approximately 12 mm length and 1.2 mm width. Herein, the first circumferential band 126A begins 10 mm from the probe tip to allow for mechanical insertion without immediate heating. Also, the spacing between circumferential bands is 15 mm, providing uniform axial distribution of heating zones. Further, the total emission zone length extends 97 mm along the probe and the coordinate system defines radial position at 5 mm from the probe center, corresponding to the outer conductor 118 surface, creating a heating pattern suitable for typical Red Palm Weevil infestation volumes.

The specific dimensional and positional characteristics of the emission slots 124 for the microwave emitter probe 106 are defined through cylindrical coordinate specifications that establish manufacturing requirements and electromagnetic performance parameters. The emission slots 124 are positioned using a coordinate system where the radial position is measured from the probe center, the angular position $\theta$ is measured in degrees around the circumference, and the axial positions $Z_1$ and $Z_2$ define the start and end points of each slot along the probe length. The coordinate specifications define 36 total emission slots 124 arranged in six circumferential bands, with each band containing six slots positioned at 60-degree angular intervals around the outer conductor 118 surface. The dimensional specifications include slot length of 12 mm, slot width of 1.2 mm, and radial position at 5 mm from the probe center, corresponding to the outer conductor 118 surface at the 10 mm total probe diameter. A coordinate table (Table 1) below provides specifications for manufacturing consistency and electromagnetic field optimization across multiple probe units.

TABLE 1

| Coordinate Table for Emission Slots | | | | | | | |
|---|---|---|---|---|---|---|---|
| Slot No. | Band | r (mm) | $\theta$ (°) | $Z_1$ (mm) | $Z_1$ (mm) | Length (mm) | Width (mm) |
| 1 | 1 | 5 | 0 | 10 | 22 | 12 | 1.2 |
| 2 | 1 | 5 | 60 | 10 | 22 | 12 | 1.2 |
| 3 | 1 | 5 | 120 | 10 | 22 | 12 | 1.2 |
| 4 | 1 | 5 | 180 | 10 | 22 | 12 | 1.2 |
| 5 | 1 | 5 | 240 | 10 | 22 | 12 | 1.2 |
| 6 | 1 | 5 | 300 | 10 | 22 | 12 | 1.2 |
| 7-12 | 2 | 5 | 0-300 | 25 | 37 | 12 | 1.2 |
| 13-18 | 3 | 5 | 0-300 | 40 | 52 | 12 | 1.2 |
| 19-24 | 4 | 5 | 0-300 | 55 | 67 | 12 | 1.2 |
| 25-30 | 5 | 5 | 0-300 | 70 | 82 | 12 | 1.2 |
| 31-36 | 6 | 5 | 0-300 | 85 | 97 | 12 | 1.2 |

Referring back to FIGS. 1A and 1B, in the pest control device 100, the temperature monitoring system 110 is configured to automatically cease microwave emission when the temperature monitor probe 108 detects a temperature above a threshold temperature. Such automatic cessation function provides safety protection that prevents overheating of tree tissue during treatment procedures. The temperature monitoring system 110 continuously monitors temperature signals from the temperature monitor probe 108 and compares measured values to predetermined threshold limits. When the threshold temperature is exceeded, the temperature monitoring system 110 immediately terminates microwave power generation to prevent thermal damage. In some examples, the threshold temperature settings are programmable to accommodate different tree species and treatment requirements. The temperature monitoring system 110 may incorporate hysteresis functions that prevent oscillatory on-off cycling near the threshold temperature. This automatic cessation function operates independently of manual controls to ensure consistent safety protection regardless of operator attention.

The pest control device 100 of the present disclosure provides multiple alternative configurations that enhance versatility and effectiveness for various pest control applications. Herein, the pest control device 100 includes modular probe configurations that accommodate varying trunk diameters and infestation depths encountered in different palm tree species and growth stages. In one configuration, the microwave emitter probe 106 includes modular length configurations including 10 cm, 15 cm, and 25 cm options that accommodate different tree sizes and infestation depths. The modular probe system enables field selection of appropriate probe length based on specific treatment requirements and tree characteristics. Further, the modular probe configurations maintain consistent outer diameter specifications of approximately 10 mm while varying the length of the emission zone to match treatment requirements. The modular configuration includes quick-connect mechanisms that facilitate rapid probe changes during treatment operations.

In another configuration, the pest control device 100 includes multiple microwave emitter probes 106 that enable simultaneous treatment of multiple infestation sites within the same tree or treatment of multiple trees concurrently. The multiple probe configuration includes independent power control for each probe to enable customized treatment parameters for different infestation characteristics. In a further configuration, the temperature monitor probe 108 includes wireless signal transmission that eliminates cable connections and provides enhanced positioning flexibility during treatment operations. The wireless configuration enables multiple temperature monitoring points throughout the treatment zone for enhanced safety and control.

In yet another configuration, the pest control device 100 includes data logging and analysis capabilities that record treatment parameters, outcomes, and tree response characteristics for optimization of future treatments. The data logging system includes GPS location recording, time and date stamps, and documentation of treatment parameters, enabling comprehensive treatment tracking. The analysis capabilities include statistical evaluation of treatment effectiveness and correlation with tree and environmental factors. In still another configuration, the pest control device 100 includes insertion depth limiters that comprise adjustable collars positioned on the microwave emitter probe 106 to prevent over-penetration during field deployment. The insertion depth limiters provide mechanical stops that ensure proper positioning of the emission slots 124 within the target treatment zone while preventing damage to tree structures beyond the infestation area. Further, the temperature monitoring system 110 may incorporate pulse duration control that enables 3 to 15 second ON/OFF cycles for controlled heating applications that prevent excessive temperature accumulation in treated tissues. Such pulse duration control provides precise thermal management, maximizing pest elimination while maintaining tree tissue viability through controlled heat application cycles.

Referring to FIG. 4, as illustrated, the present disclosure further provides a method 400 of treating an insect infestation of a woody plant. The method 400 provides a systematic approach for applying microwave pest control treatment to eliminate Red Palm Weevil infestations while preserving tree health. The method 400 integrates the use of the pest control device 100 with specific procedural steps that ensure safe and effective treatment outcomes.

At step 402, the method 400 includes drilling a first hole and a second hole into the woody plant. The drilling of the first hole and the second hole creates access points for insertion of the microwave emitter probe 106 and the temperature monitor probe 108, respectively. The first hole is sized to accommodate the diameter of the microwave emitter probe 106 while providing secure positioning during treatment. The second hole is sized for the temperature monitor probe 108 and positioned at a predetermined distance from the first hole to enable accurate temperature monitoring of the treatment zone. Herein, the first hole depth is selected based on the infestation location and length of the microwave emitter probe 106 being used for treatment. Further, the second hole depth is selected to position the temperature monitor probe 108 at the same depth as the microwave emitter probe 106 to ensure representative temperature measurement. The hole spacing is optimized to provide accurate temperature feedback while avoiding interference with the microwave heating pattern.

At step 404, the method 400 includes inserting the microwave emitter probe 106 of the pest control device 100 into the first hole. The insertion of the microwave emitter probe 106 positions the emission slots 124 within the infested wood tissue to enable direct heating of pest habitat areas. As discussed, the insertion depth is controlled to place the emission zone of the microwave emitter probe 106 at the appropriate location relative to the infestation. The proper insertion of the microwave emitter probe 106 ensures optimal coupling of microwave energy into the target treatment zone. The insertion procedure accommodates variations in wood density and moisture content that may affect insertion force requirements. The insertion process includes verification that the microwave emitter probe 106 is fully seated and properly positioned for treatment. The insertion of the microwave emitter probe 106 may also involve securing mechanisms that prevent movement during subsequent treatment operations. The proper insertion of the microwave emitter probe 106 ensures optimal coupling of microwave energy into the target treatment zone.

At step 406, the method 400 includes placing the temperature monitor probe 108 of the pest control device 100 into the second hole. The placement of the temperature monitor probe 108 enables real-time temperature monitoring during microwave heating operations. The temperature monitor probe 108 is positioned generally at the same depth as the microwave emitter probe 106 to provide a representative temperature measurement of the treatment zone. The placement procedure ensures that the temperature monitor probe 108 does not interfere with microwave field patterns generated by the microwave emitter probe 106. The temperature monitor probe 108 positioning provides accurate feedback for automatic safety control functions. The proper placement of the temperature monitor probe 108 enables precise temperature control that prevents overheating while ensuring lethal temperatures are achieved in the pest habitat.

At step 408, the method 400 includes emitting microwave radiation using the microwave emitter probe 106, in which the emitting causes the woody plant to increase in temperature. The emitting of microwave radiation delivers controlled energy to the treatment zone through the plurality of emission slots 124 in the microwave emitter probe 106. The microwave radiation creates dielectric heating in wood tissue and contained pest organisms through interaction with water molecules and other polar compounds. The emitting process is controlled by the temperature monitoring system 110 to maintain appropriate power levels and heating rates. The emission of microwave radiation generates thermal energy that raises the temperature of infested wood tissue to levels lethal to Red Palm Weevil larvae, pupae, and eggs. The heating pattern created by the emission slots 124 provides a uniform temperature distribution throughout the treatment zone. The emitting process continues for predetermined periods or until target temperatures are achieved as measured by the temperature monitor probe 108.

The method 400 further includes ceasing the emitting when the temperature monitor probe 108 detects a temperature above a threshold temperature. The ceasing of microwave emission provides automatic safety protection that prevents thermal damage to healthy tree tissue during treatment procedures. The ceasing function operates through the temperature monitoring system 110, which continuously monitors temperature signals from the temperature monitor probe 108 and compares measured values to predetermined threshold limits. When the threshold temperature is detected, the temperature monitoring system 110 immediately terminates microwave power generation and alerts the operator to the cessation event. Such automatic ceasing ensures consistent safety protection regardless of operator attention or manual intervention during treatment cycles.

In present implementations, the threshold temperature is 40 to 60° C. The threshold temperature range of 40 to 60° C. provides effective pest elimination while maintaining tree tissue viability within safe limits. The lower limit of 40° C. ensures sufficient heating to disrupt pest metabolism and cellular function, resulting in mortality. The upper limit of 60° C. prevents excessive heating that could damage tree cambium, phloem, and other vital tissue layers. Temperatures within this range achieve lethal conditions for Red Palm Weevil larvae, pupae, and eggs while avoiding thermal damage to healthy wood cells and vascular structures. The threshold temperature selection considers the thermal tolerance of palm tree tissues and the thermal sensitivity of target pest organisms. The threshold temperature range accommodates variations in tree species, moisture content, and environmental conditions encountered in field applications.

Herein, the emitting microwave radiation using the microwave emitter probe 106 creates a heating zone having a diameter of 5 to 15 cm centered on the microwave emitter probe 106. The heating zone diameter of 5 to 15 cm provides adequate coverage for typical Red Palm Weevil infestation volumes while maintaining focused energy application. The heating zone dimensions are determined by the microwave frequency, power level, and electromagnetic properties of wood tissue in the treatment area. The cylindrical heating zone extends along the length of the emission slots 124 to create a three-dimensional treatment volume. The heating zone pattern provides uniform temperature distribution that ensures consistent pest elimination throughout the treated volume.

Figure 5A:
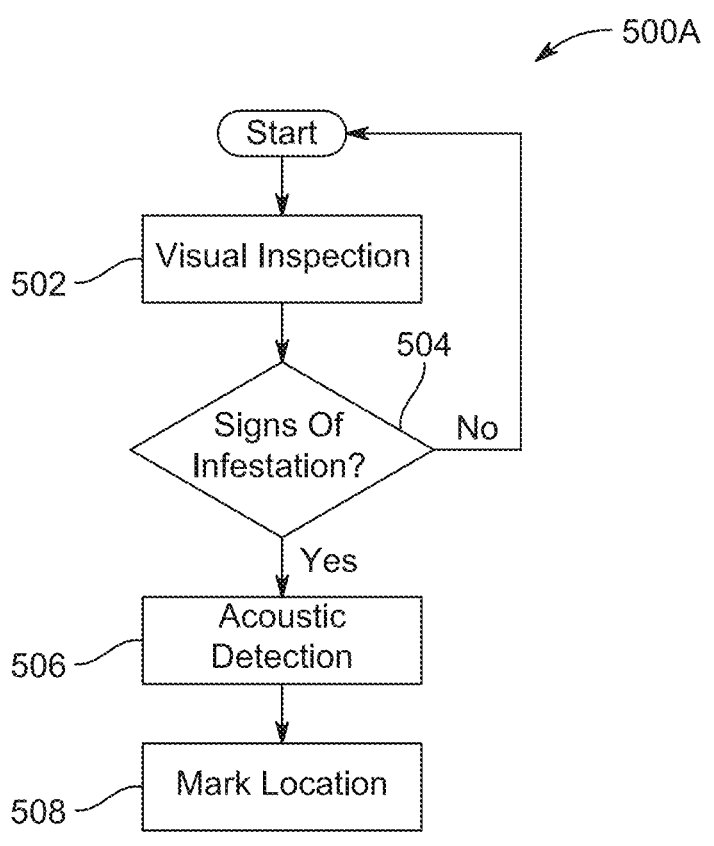
FIG. 5A is an exemplary flowchart illustrating a detection and preparation process, according to certain embodiments.
Figure 5B:
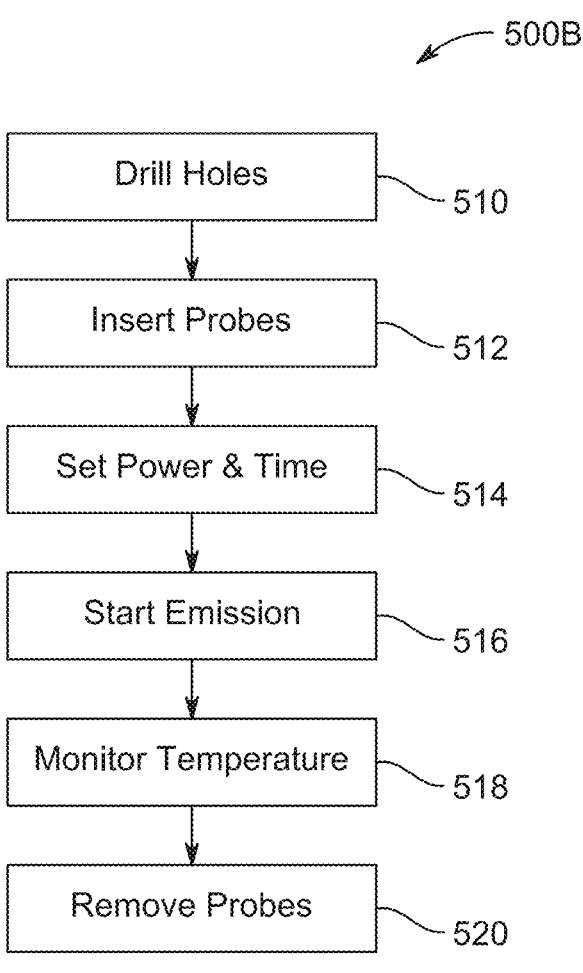
FIG. 5B is an exemplary flowchart illustrating a treatment execution process, according to certain embodiments.
Figure 5C:
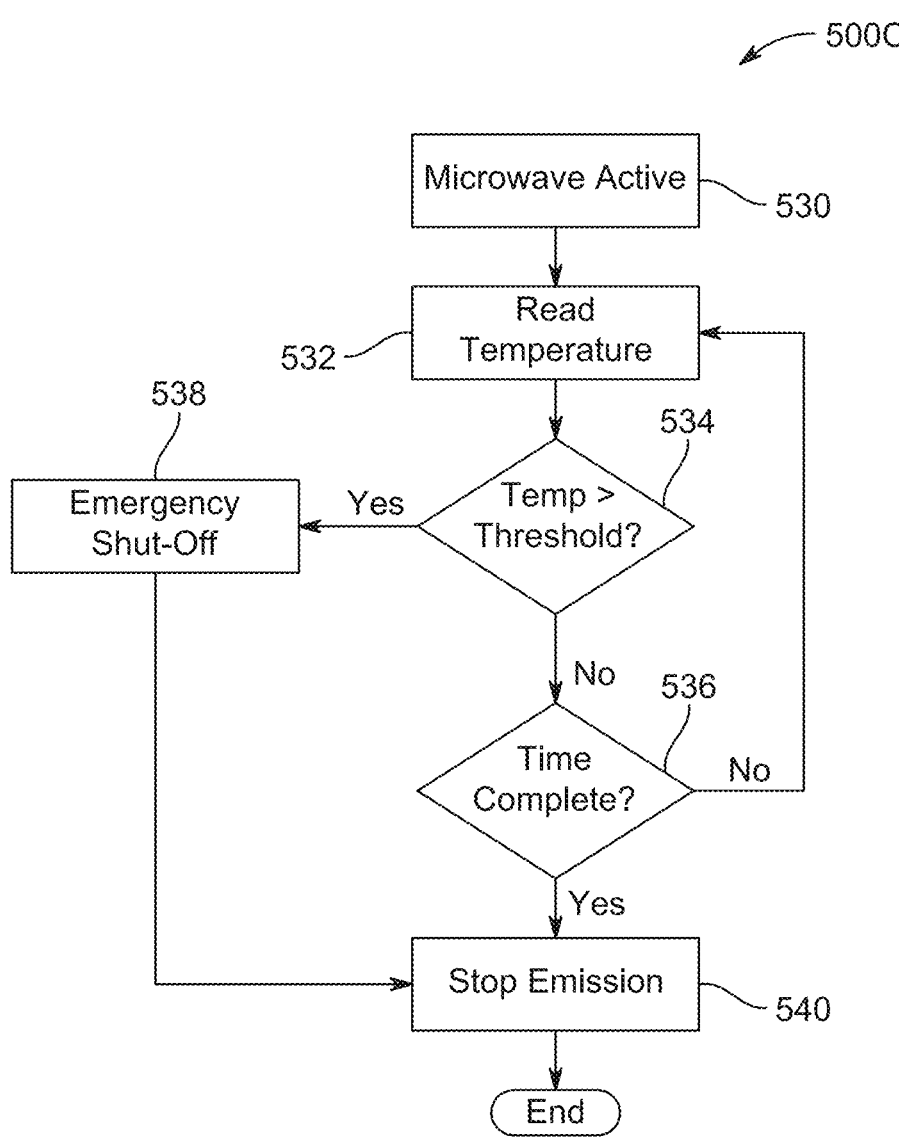
FIG. 5C is an exemplary flowchart illustrating a monitoring and safety control process, according to certain embodiments.

The detailed process flows for implementing the method 400 are further illustrated in FIGS. 5A, 5B, and 5C, which show specific sub-processes for detection and preparation, treatment execution, and monitoring and safety control, respectively.

Referring to FIG. 5A, illustrated is a flowchart of a detection and preparation process 500A according to certain embodiments. The detection and preparation process 500A provides systematic procedures for identifying infestations and preparing treatment sites prior to microwave application. The process 500A begins at a start point and proceeds through sequential evaluation steps. At step 502, the process 500A includes conducting visual inspection of the tree to identify potential infestation sites and assess external indicators of pest activity. The process 500A then proceeds to a decision point 504 where signs of infestation are evaluated to determine if sufficient evidence exists to warrant treatment. If no signs of infestation are detected, the process returns to the visual inspection step 502 for continued monitoring. If signs of infestation are confirmed, the process 500A proceeds to step 506 which includes conducting acoustic detection using specialized equipment to locate Red Palm Weevil larvae activity within the tree structure through sound analysis. At step 508, the process 500A includes marking the location of confirmed infestations to establish precise coordinates for subsequent drilling and probe insertion procedures.

Referring to FIG. 5B, illustrated is a flowchart of a treatment execution process 500B according to certain embodiments. The treatment execution process 500B provides detailed procedures for performing microwave heating treatment once infestation locations have been identified and marked. At step 510, the process 500B includes drilling holes into the woody plant at the marked locations to create access points for probe insertion. At step 512, the process 500B includes inserting probes into the drilled holes, specifically placing the microwave emitter probe 106 into the first hole and the temperature monitor probe 108 into the second hole. At step 514, the process 500B includes setting power and time parameters for the treatment based on infestation characteristics, tree size, and species-specific requirements. At step 516, the process 500B includes starting emission of microwave radiation using the microwave emitter probe 106 to begin heating the infested tissue. At step 518, the process 500B includes monitoring temperature during the treatment to ensure proper heating levels are achieved while maintaining safety limits. At step 520, the process 500B includes removing probes from the holes after treatment completion and sealing the access holes to promote tree healing.

Referring to FIG. 5C, illustrated is a flowchart of a monitoring and safety control process 500C according to certain embodiments. The monitoring and safety control process 500C provides continuous oversight during treatment operations to ensure safe and effective pest elimination. The process 500C begins at step 530 where microwave emission is active and heating is taking place. At step 532, the process 500C includes reading temperature measurements from the temperature monitor probe 108 to assess current thermal conditions in the treatment zone. The process 500C then proceeds to decision point 534 where the measured temperature is compared to a predetermined threshold value. If the temperature exceeds the threshold, the process 500C proceeds to step 538 for emergency shut-off to immediately cease microwave emission and prevent thermal damage to the tree. If the temperature remains below the threshold, the process 500C continues to decision point 536 where treatment time completion is evaluated. If the treatment time is not complete, the process 500C returns to step 532 to continue temperature monitoring in a continuous loop. If the treatment time is complete, the process 500C proceeds to step 540 to stop emission and terminate the heating process, leading to the end of the monitoring cycle.

In aspects of the present disclosure, the insect is a red palm weevil. The red palm weevil (*Rhynchophorus ferrugineus*) represents the primary target pest for the pest control device 100 and the method 400 of the present disclosure. Red palm weevil larvae create extensive tunnel systems within palm tree trunks that provide ideal targets for microwave heating applications. The red palm weevil life cycle includes egg, larval, pupal, and adult stages, with the larval stage being most susceptible to thermal treatment due to extended development periods within the tree structure. Red palm weevil infestations typically occur in the central regions of palm trunks where larvae feed on nutrient-rich tissues and create protective chambers. The microwave heating approach targets these infestation sites directly through insertion of the microwave emitter probe 106 into the affected areas.

Further, herein, the woody plant is a palm tree. The palm tree represents the primary host plant for Red Palm Weevil infestations and the intended application for the pest control device 100. Palm trees include various species such as date palms, coconut palms, and ornamental palm varieties commonly affected by Red Palm Weevil infestations. Palm tree anatomy includes fibrous trunk structure that facilitates probe insertion while providing access to infestation sites within the central tissues. The palm tree treatment approach using the pest control device 100 enables preservation of valuable trees that would otherwise require removal due to severe infestation damage.

The pest control device 100 and the method 400 of the present disclosure provide numerous advantages over conventional pest control approaches for Red Palm Weevil elimination. The targeted delivery of microwave energy through insertable probes enables precise heating of infestation sites while minimizing impact on healthy tree tissue. The real-time temperature monitoring and automatic safety controls prevent overheating and ensure tree preservation during treatment procedures. The non-chemical approach eliminates environmental concerns associated with pesticide applications and residue accumulation. The portable and modular design of the pest control device 100 enables field deployment for treatment of individual trees or systematic treatment of plantation areas. The adjustable power output and treatment parameters provide optimization capabilities for different infestation severities and tree characteristics. The rapid treatment times reduce labor requirements and enable efficient coverage of large areas with multiple infestations.

The pest control device 100 provides immediate pest elimination without waiting periods required for chemical treatments to take effect. The treatment approach preserves beneficial insects and soil organisms that may be affected by broad-spectrum chemical applications. The economic benefits of the pest control device 100 include reduced chemical costs, elimination of repeated treatment requirements, and preservation of valuable palm trees that would otherwise require removal. The environmental benefits include reduced pesticide usage, elimination of chemical runoff, and preservation of ecosystem function in treated areas. The operational benefits include simplified treatment procedures, reduced safety precautions compared to chemical handling, and immediate verification of treatment effectiveness through temperature monitoring.

Figure 6:
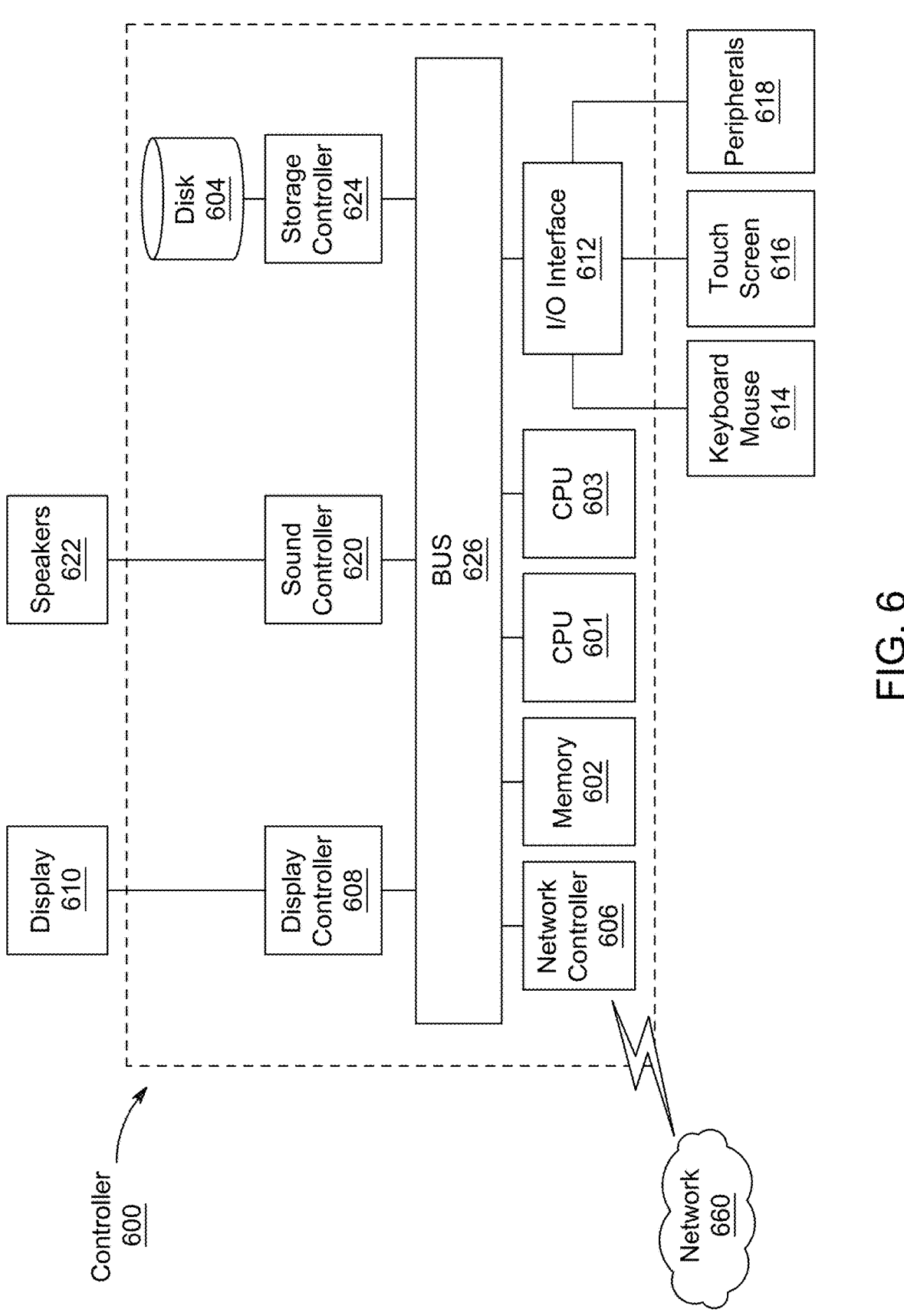
FIG. 6 is an illustration of a non-limiting example of details of computing hardware used in the computing system, according to certain embodiments.

Next, further details of the hardware description of the computing environment according to exemplary embodiments are described with reference to FIG. 6. In FIG. 6, a controller 600 is described embodying the temperature monitoring system 110 of the pest control device 100 of the present disclosure, in which the controller is a computing device that includes a CPU 601, which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
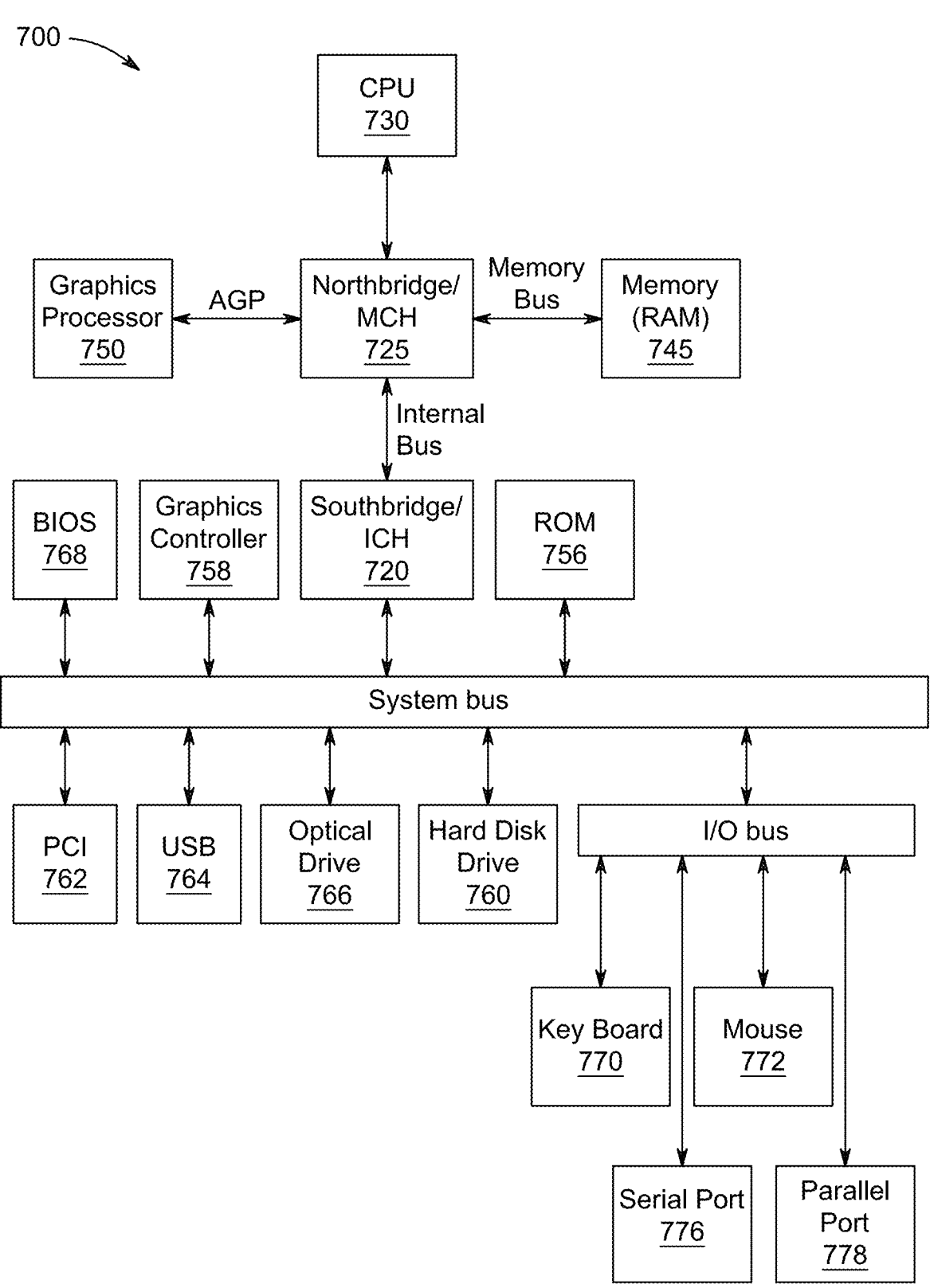
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
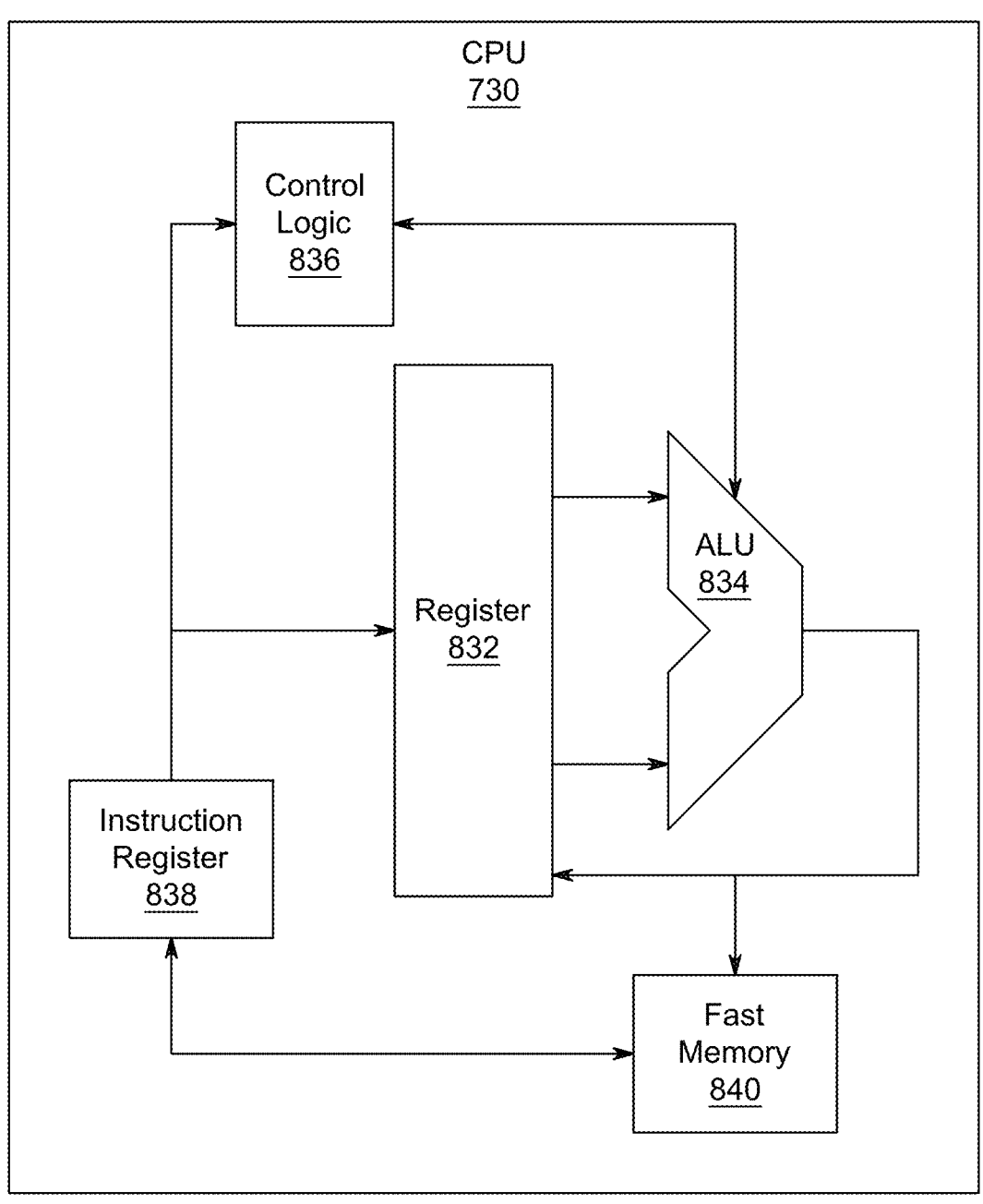
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture.

Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/ output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
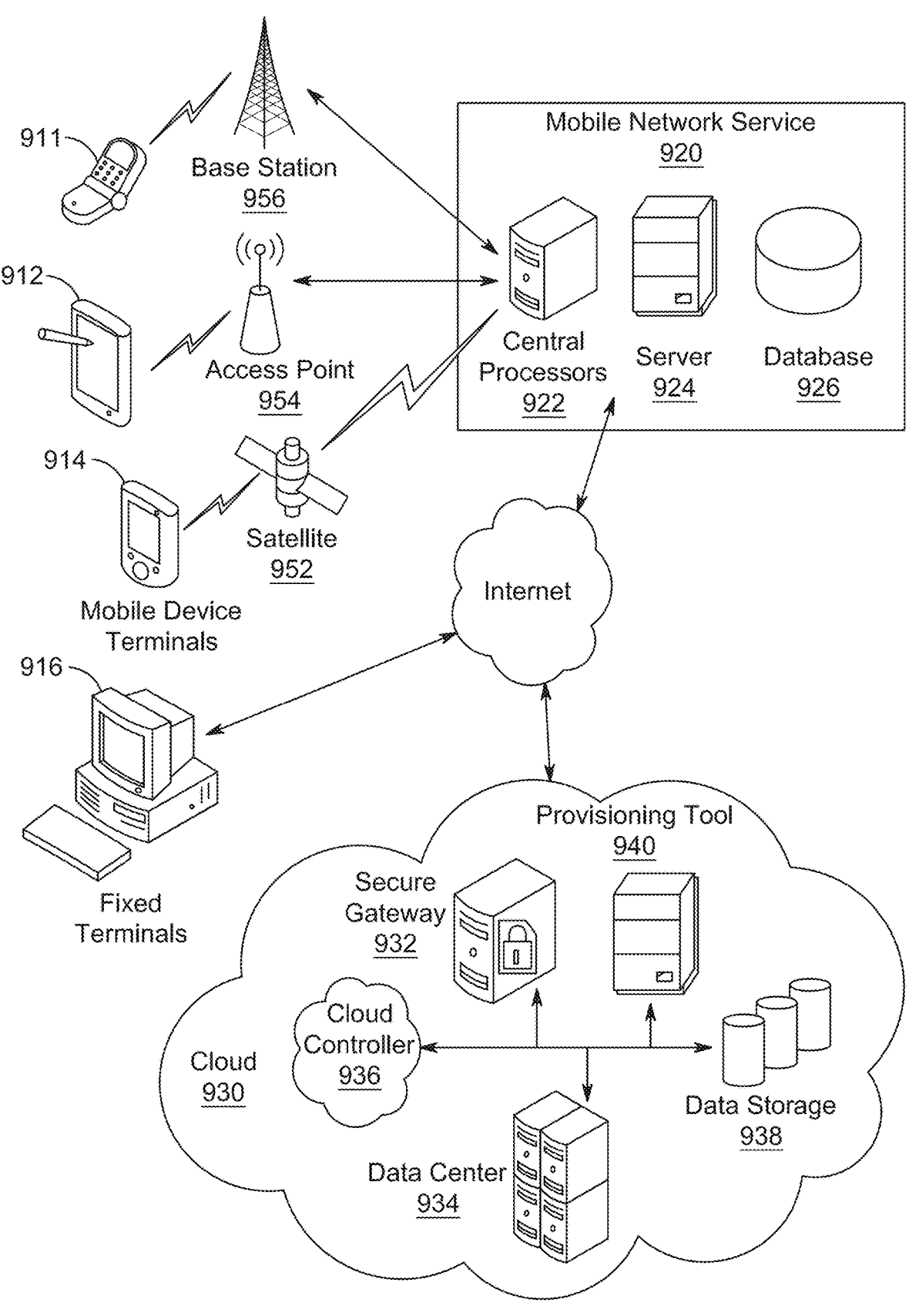
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 930 including a cloud controller 936, a secure gateway 932, a data center 934, data storage 938 and a provisioning tool 940, and mobile network services 920 including central processors 922, a server 924 and a database 926, which may share processing, as shown by FIG. 9, in addition to various human interface and communication devices (e.g., display monitors 916, smart phones 910, tablets 912, personal digital assistants (PDAs) 914). The network may be a private network, such as a LAN, satellite 952, or WAN 954, or a public network, such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of a corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A pest control device, comprising an electronic controller, wherein the electronic controller is cuboidal, has a top side, a bottom side, a front side, a back side, a left side, and a right side;

a microwave generator disposed in the electronic controller, wherein the microwave generator is connected to a microwave emitter probe via a coaxial cable, wherein the microwave emitter probe is connected at the top side of the electronic controller, wherein the microwave emitter probe is cylindrical with a microwave emitter probe length of 5 to 50 cm and a microwave emitter probe diameter of 0.25 to 5 cm;

a temperature monitor probe connected to the left side of the electronic controller via a flexible cable, wherein the temperature monitor probe is cylindrical with a temperature monitor probe length of 1 to 25 cm and a temperature monitor probe diameter of 0.5 to 5 cm, wherein the temperature monitor probe comprises an infrared sensor to detect a temperature inside a tree;

a temperature monitoring system disposed at the front side of the electronic controller, wherein the temperature monitoring system comprises a feedback circuit to display a thermogram and to adjust a microwave frequency, an alert system with a temperature threshold limit, and an user interface panel, wherein the user interface panel displays the temperature, the microwave frequency, and a microwave operation time;

at least one or more cooling fans disposed at an apex of the left and right sides of the electronic controller;

a control unit positioned below the user interface panel at the front of the electronic controller, wherein the control unit comprises a microwave intensity button, a power supply button, and a microwave operation time button.

2. The pest control device of claim 1, wherein the microwave generator produced a frequency of 2.0 to 4.0 GHz.

3. The pest control device of claim 1, wherein the microwave emitter probe comprises a plurality of emission slots disposed on an exterior of the microwave emitter probe.

4. The pest control device of claim 3, wherein the plurality of emission slots has rectangular geometry with dimensions of 12 mm in length and 1.2 mm in width.

5. The pest control device of claim 3, wherein the plurality of emission slots is formed as an array of slots, the array comprising a circumferential band of slots equally spaced about an exterior circumference of the microwave emitter probe.

6. The pest control device of claim 5, wherein the array comprises a plurality of circumferential bands of slots.

7. The pest control device of claim 1, wherein the coaxial cable comprising a central conductor and an outer conductor separated by a dielectric layer, wherein the central conductor is made of a solid copper or silver-plated copper material.

8. The pest control device of claim 1, wherein the infrared sensor is disposed at a top end of the temperature monitor probe and is configured to detect infrared radiation in a wavelength range from approximately 0.74 μm to 14 μm.

9. The pest control device of claim 1, wherein the feedback circuit is configured to convert and display the detected infrared radiation into the thermogram on the user interface panel of the temperature monitor system.

10. The pest control device of claim 1, wherein the temperature threshold limit for the alert system is set between about 40 to 60° C.

11. The pest control device of claim 1, wherein the user interface panel comprises a touch screen configured to display the thermogram, temperature ranging from 23° C. to 100° C., microwave frequency ranging from 0 to 10 GHz, and microwave operation time ranging from 0 to 120 minutes.

12. The pest control device of claim 1, wherein the control unit is manually adjustable, comprising;

the microwave intensity button is configured from 0 to 10 GHz;

the microwave operation time button is configured from 0 to 120 min;

the power supply button is configured from 250 to 1500 Watts.

*    *    *    *    *